(12) United States Patent
Anderson et al.

(10) Patent No.: US 8,706,136 B2
(45) Date of Patent: Apr. 22, 2014

(54) INITIALIZATION OF REGULATORY CONFIGURATIONS OF UNLICENSED WIRELESS DEVICES

(75) Inventors: Fred J. Anderson, Lakeville, OH (US); Michael Adler, Pepper Pike, OH (US); Sangita Mahishi, Pepper Pike, OH (US); James C. Nicholson, Akron, OH (US); David Alan Case, North Canton, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/166,609

(22) Filed: Jun. 22, 2011

(65) Prior Publication Data

US 2012/0052876 A1 Mar. 1, 2012

Related U.S. Application Data

(60) Provisional application No. 61/376,881, filed on Aug. 25, 2010.

(51) Int. Cl.
*H04W 24/00* (2009.01)
*H04W 36/00* (2009.01)

(52) U.S. Cl.
USPC ...................... 455/456.1; 455/436

(58) Field of Classification Search
USPC ........................... 455/456.1–456.6
See application file for complete search history.

(56) References Cited

U.S. PATENT DOCUMENTS

| | | | |
|---|---|---|---|
| 7,457,869 B2 | 11/2008 | Kernan | |
| 7,574,217 B1 | 8/2009 | Leung et al. | |
| 2005/0225441 A1* | 10/2005 | Kernan | 340/506 |
| 2007/0038776 A1* | 2/2007 | Abhishek et al. | 709/245 |
| 2008/0164310 A1 | 7/2008 | Dupuy et al. | |
| 2009/0031123 A1* | 1/2009 | Kruys | 713/1 |

FOREIGN PATENT DOCUMENTS

| | | | | |
|---|---|---|---|---|
| EP | 1 560 451 | * | 1/2005 | H04Q 7/36 |
| EP | 1 560 451 A2 | | 8/2005 | |
| WO | WO 2011/015960 A1 | | 2/2011 | |

OTHER PUBLICATIONS

International Search Report and Written Opinion dated Feb. 8, 2012 for the related International Application No. PCT/US2011/045170.
PCT/US11/45170 Invitation to Pay Additional Fees and Partial International Search Report, Nov. 22, 2011.
PCT/US11/45170 International Preliminary Report on Patentability and Written Opinion of the International Search Authority dated Feb. 26, 2013.

* cited by examiner

*Primary Examiner* — Michael Faragalla
(74) *Attorney, Agent, or Firm* — Tucker Ellis LLP

(57) ABSTRACT

In an example embodiment, a mobile wireless device, such as a mobile telephone, is employed to configure a second wireless device such as an access point. The mobile wireless device determines its location and a regulatory domain corresponding to the location. The mobile wireless device configures the second wireless device to operate in the regulatory domain.

11 Claims, 8 Drawing Sheets

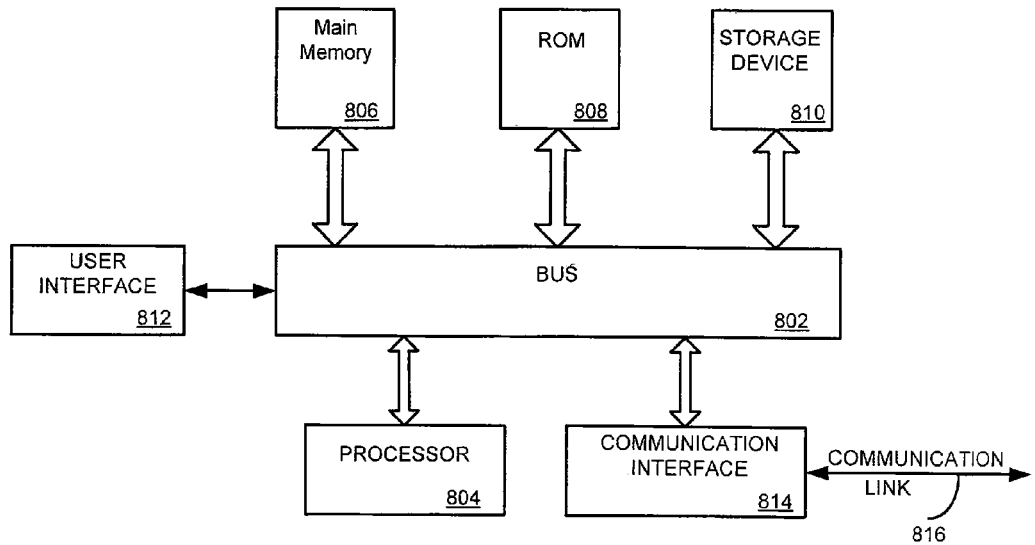
FIG. 8
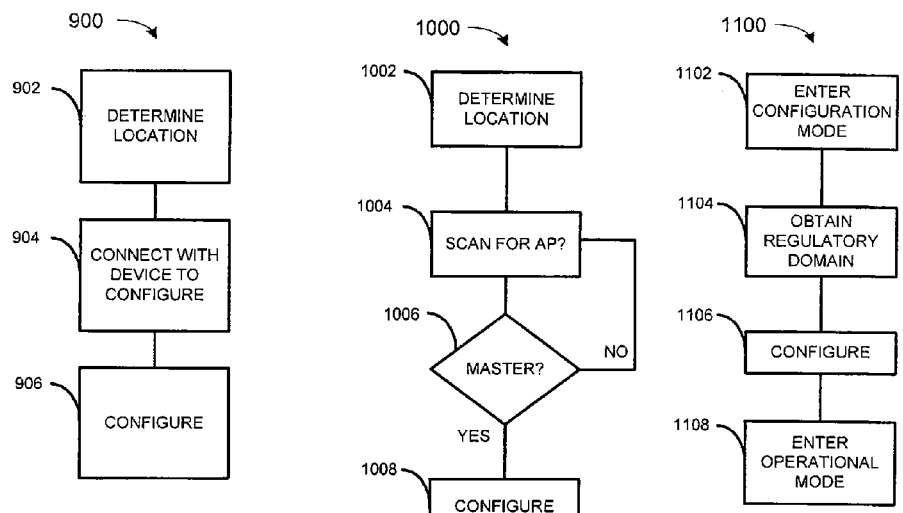
FIG. 9  FIG. 10  FIG. 11

INITIALIZATION OF REGULATORY CONFIGURATIONS OF UNLICENSED WIRELESS DEVICES

CROSS REFERENCE TO RELATED APPLICATIONS

This application claims the benefit of U.S. Provisional Application No. 61/376,881, filed Aug. 25, 2010.

TECHNICAL FIELD

The present disclosure relates generally to the configuration of wireless networking devices.

BACKGROUND

Many countries have regulator requirements for unlicensed wireless devices such as WiFi network devices, which require diligence on behalf of the manufacturer to insure that the devices will not operate outside of local regulations and restrictions. For example manufacturers may limit the ability of customers or end users to configure or operate their equipment. Thus to comply with local restrictions, manufacturers pre-configure equipment based on country of destination. To accommodate this, manufacturers define different SKUs (Stock Keeping Units) for each regulatory domain that leads to extra expense in the manufacturing and direct fulfillment (DF) processes.

BRIEF DESCRIPTION OF THE DRAWINGS

The accompanying drawings incorporated herein and forming a part of the specification illustrate the example embodiments.

FIG. 8 is a block diagram of a computer system upon which an example embodiment can be implemented.

FIG. 9 is a block diagram of an example methodology for employing a wireless device to configure a second wireless device.

FIG. 10 is a block diagram of an example methodology for configuring a plurality of wireless devices.

FIG. 11 is a block diagram of an example methodology for a wireless device to receive regulatory domain data.

OVERVIEW OF EXAMPLE EMBODIMENTS

Figure 1:
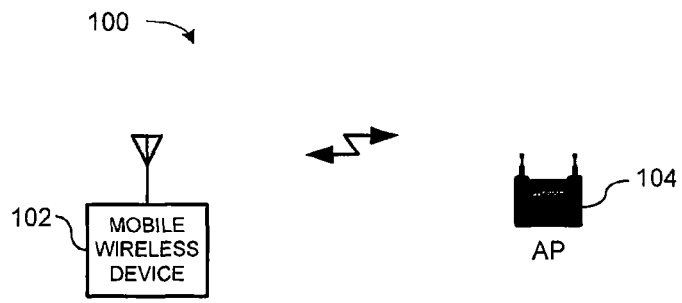
FIG. 1 illustrates an example of a network where a mobile wireless device is employed to configure an access point.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, In an example embodiment, a mobile wireless device, such as a mobile telephone, is employed to configure a second wireless device such as an access point. The mobile wireless device determines its location and a regulatory domain corresponding to the location. The mobile wireless device configures the second wireless device to operate in the regulatory domain.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 illustrates an example of a network 100 where a mobile wireless device 102 is employed to configure an access point (AP) 104. In an example embodiment, an application installed on mobile wireless device 102 implements the functionality described herein. For example the application for implementing the functionality described herein may be installed on wireless devices such as an IPHONE and/or DROID, or any suitable mobile wireless device. In particular embodiments, the application is a controlled and secured application on mobile wireless device 102.

In an example embodiment, mobile wireless device 102 determines its present location, and determines the appropriate regulatory domain for its present location. Mobile wireless device 102 may use any suitable means for obtaining its current location, which in at least one embodiment may be dictated by regulatory requirements. For example, mobile wireless device may employ Global Positioning Satellite (GPS) and/or cellular network location data.

Wireless mobile device 102 searches for a wireless device (AP 104 in this example) that is waiting to be configured. For example, wireless mobile device 102 may search for a predefined Basic Service Set (BSS). As another example, mobile wireless device 102 may search for AP 104 on a predefined channel (for example 2.4 giga hertz (GHz)) for unconfigured devices.

In an example embodiment, mobile wireless device 102 and AP 104 authenticate with each other before allowing mobile wireless device 102 to configure AP 104. Any suitable means for authentication may be employed such as shared secret, public key/private key, certificates, etc.

Mobile wireless device 102 provisions AP 104 with the appropriate regulatory domain. In an example embodiment, mobile wireless device 102 also provisions AP 104 with the appropriate operating parameters, for example, channels, maximum power, etc. for the regulatory domain.

Figure 2:
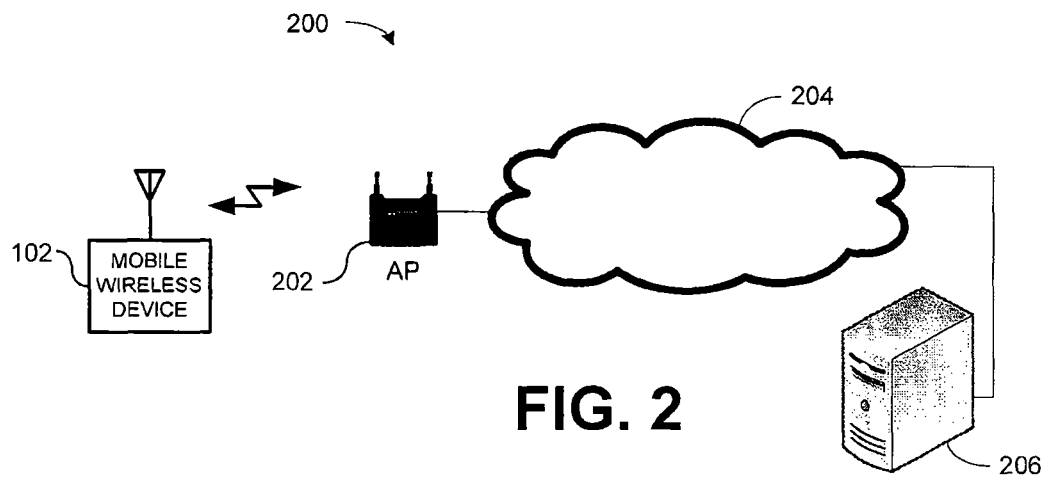
FIG. 2 illustrates an example of a network where a mobile wireless device is employed to provision an access point with a regulatory domain, and the access point obtains the appropriate parameters from a device disposed on a network.

In an example embodiment, as illustrated in FIG. 2, mobile wireless device 102 provisions an AP 202 with the regulatory domain, and operating parameters are obtained from a server 206. In one embodiment, the AP 202 receives data representative of the regulatory domain from the mobile wireless device 102, and AP communicates with server 206 to obtain the operating parameters for the regulatory domain.

In another example embodiment, Mobile wireless device 102 determines the regulatory domain and obtains the operating parameters from server 206. Data representative of the operating parameters, and in particular embodiments the regulatory domain, are provisioned to AP 202. For example, if AP 202 does not have Internet capability, mobile wireless device 102 may obtain the operating parameters via other means. For example, if mobile wireless device 102 is a smartphone, mobile wireless device 102 may obtain the operating parameters via a cellular network (not shown) that is coupled to server 206.

For example, as illustrated by network 200 in FIG. 2, mobile wireless device 102 determines its location and the corresponding regulatory domain. Mobile wireless device 102 provides AP 202 with the regulatory domain. AP 202 communicates via network 204 with server 206. In an example embodiment, mobile wireless device 102 provides AP 202 with an address (for example an Internet Protocol "IP" address) for server 206. In another example embodiment, AP 202 is pre-configured with the address for server 206. For example, the address for server 206 may be installed by the manufacturer of AP 202. In an example embodiment, server 206 is a publicly available server, in an alternative embodiment, AP 202 authenticates server 206. AP 202 obtains the appropriate operating parameters for the regulatory from server 206. In particular embodiments, AP 202 may periodically, or aperiodically, communicate with server 206 to obtain updated operating parameters for the regulatory domain. For example, based on updated operating parameters, AP 202 can determine whether new channels are available or whether power levels have changed.

In an example embodiment, mobile wireless device 102 stores a geo-location snapshot for a predefined time period. This feature can be employed for areas where geo-location signals may be unavailable, such as large buildings and/or mine shafts. For example, an application on wireless device 102 may be launched in an area where wireless mobile device 102 can determine its location, and regulatory domain corresponding to the location. This data can be stored for a predefined period of time enabling mobile wireless device 102 to configure any wireless devices it establishes communication with after geo-location capabilities have ceased functioning.

Figure 3:
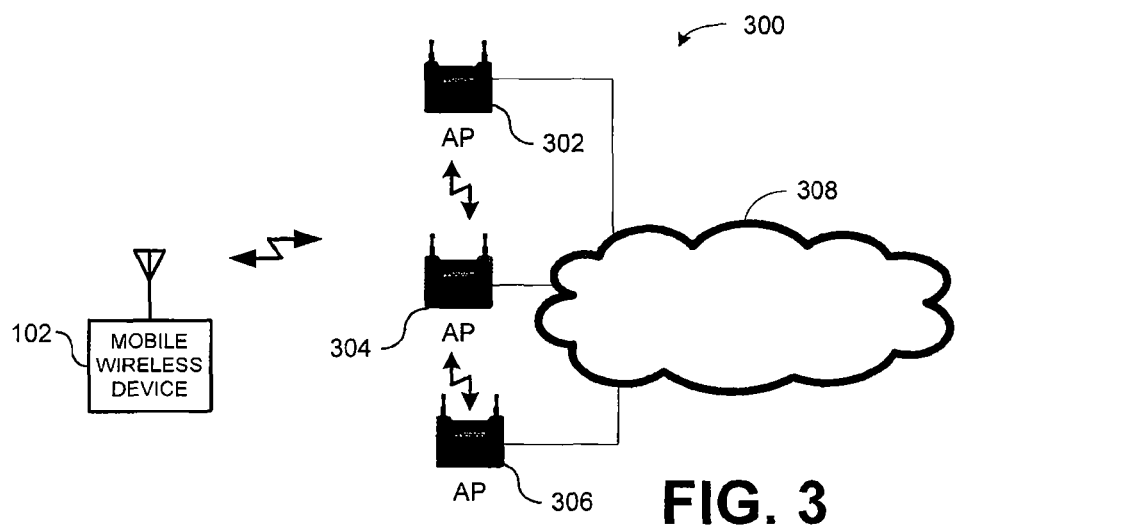
FIG. 3 illustrates an example of a network where a mobile wireless device is employed to configure a plurality of access points.

FIG. 3 illustrates an example of a network 300 where a mobile wireless device 102 is employed to configure a plurality of access points 302, 304, 306. Mobile wireless device 102 configures one AP, for example AP 304, and the configured AP configures other APs in the same physical area and/or subnet. In an example embodiment, one AP can be designated a "master" AP for the group. In this embodiment, the master AP is configured by mobile wireless device 102, which then configures the remaining APs in the group. In another example embodiment, any AP in a group can be configured by mobile wireless device 102, and the configured AP then communicates with the other APs in the group and provisions them with the regulatory domain data. Examples of where APs 302, 304, 306 may be in the same area and/or subnet include but are not limited to APs in the same IP subnet domain, APs within a predefined range of IP addresses, APs coupled to a common switch (not shown). In an example embodiment, an Internetwork Operating System (IOS) can verify which APs are in the same subnet. In another example embodiment, APs within wireless range of the AP being configured by wireless mobile device 102 can be considered to be in the same area and/or subnet.

In the illustrated example, mobile wireless device 102 establishes communications and configures AP 304. AP 304 configures APs 302, 306. AP 304 may communicate with APs 302, 306 wirelessly, or via a network 308 coupling AP 304 with APs 302, 306.

In particular embodiments, mobile wireless device 102 may determine a regulatory domain corresponding to its present location, and provide regulatory domain data to at least one AP of a group of APs, and the group of APs obtain the operating parameters from a server coupled with the APs.

Figure 4:
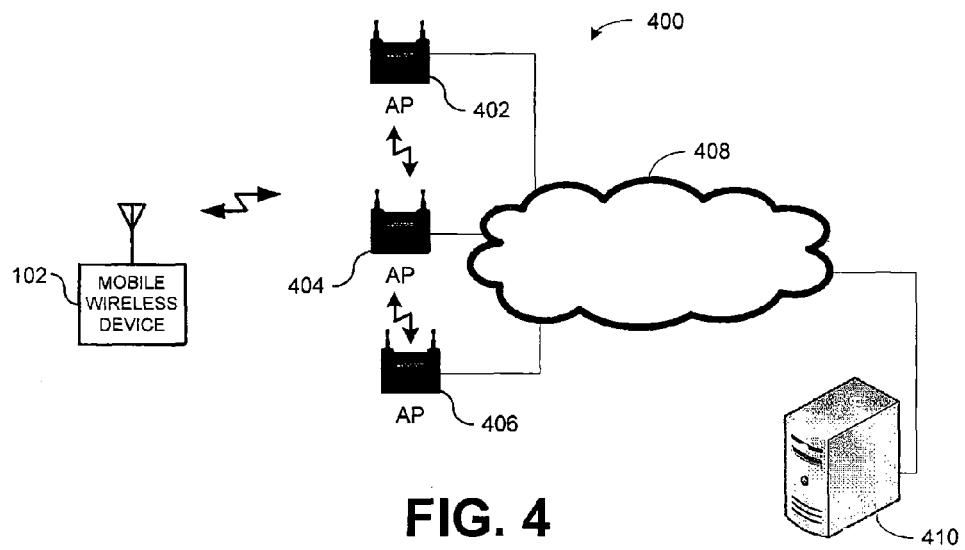
FIG. 4 illustrates an example of a network where a mobile wireless device provisions a plurality of access points with a regulatory domain and the access points obtain the appropriate operating parameters from a device disposed on a network.

FIG. 4 illustrates an example of a network 400 where a mobile wireless device 102 provisions at least one of a plurality of access points 402, 404, 406 with a regulatory domain and the access point (or access points) obtain the appropriate operating parameters from a server 410 disposed on a network 408 coupled with the access point(s).

For example, mobile wireless device 102 can determine its location and the regulatory domain corresponding to its location. Wireless mobile device 102 communicates with AP 404 (which in particular embodiments may be a "master" AP for the group of APs). Mobile wireless device provisions AP 404 with a regulatory domain. AP 404 obtains operating parameters for the regulatory domain via network 408 from server 410. AP 404 also communicates regulatory domain data to APs 402, 406. AP 404 may send the data wireless to APs 402, 406 or via network 408. In an example embodiment, network 408 is a wired network; however, in another example embodiment, network 408 is a wireless, e.g., a Mesh network. In an example embodiment, AP 404 provides APs 402, 406 with the operating parameters for the regulatory domain. In another example embodiment, APs 402, 406 communicate via network 408 to obtain the operating parameters for the regulatory domain from server 410.

Figure 5:
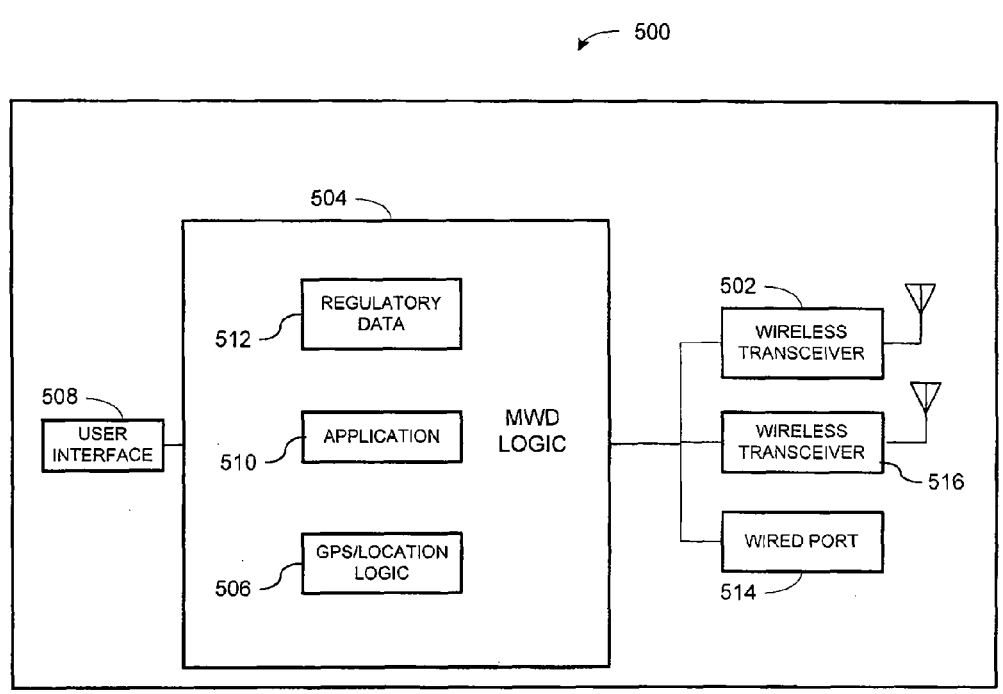
FIG. 5 is a block diagram illustrating an example of a mobile wireless device for implementing an example embodiment.

FIG. 5 is a block diagram illustrating an example of a mobile wireless device 500 for implementing an example embodiment. Mobile wireless device 500 is suitable for implementing mobile wireless device 102 (FIGS. 1-4). Mobile wireless device 500 comprises a wireless transceiver 502 and mobile wireless device (MWD) logic 504 coupled with wireless transceiver. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, MWD logic 504 comprises regulatory data 512, an application 510, and GPS/Location logic 506, and is coupled to a user interface 508. In particular embodiments, application 510 is a controlled and secure application.

In an example embodiment, wireless transceiver 502 communicates wirelessly with a device such as an access point. MWD logic 504 sends regulatory domain data 512 to the device via wireless transceiver 502. Regulatory domain data may suitably comprise data representative of the regulatory domain, and/or may include operating parameters such as channels, power levels, protocols etc. for the regulatory domain.

MWD logic 504 is configured to obtain GPS or other location data from module GPS/Location logic 506. User interface 508 is employed to enable a user to launch application 510, which performs the functionality described herein. For example, application 510, which may be implemented by MWD logic 504, obtains GPS/location data from GPS/location logic 506 and determines a regulatory domain corresponding to the location and provides regulatory domain data 512 suitable for configuring a wireless device via wireless transceiver 502.

Optionally, wired port 514 is employed for configuring a wireless device with regulatory domain data. For example, location data is obtained via wireless transceiver 502 by MWD logic 504. A wired connector, such as a serial or Universal Serial Bus (USB) cable coupled wireless device 500 to the wireless device being configured. Logic 502 sends regulatory data 512 corresponding to the current location via wired port 514 to the wireless device being configured.

In an example embodiment, mobile wireless device 500 comprises a second wireless transceiver 516. For example, if mobile wireless device 500 is a smart phone, the wireless transceiver 102 may be employed for communicating via WiFi and wireless transceiver 516 may be employed for communicating with a cellular network. GPS/Location logic 506 may obtain GPS data via wireless transceiver 502 or location data from a cellular network via transceiver 516, or data from a cellular network that GPS/location logic 506 can use to determine mobile wireless device's 500 current location. Logic 504 obtains regulatory domain data 512 corresponding to the current location. In particular embodiments the regulatory domain data comprise operating parameters such as channels, power levels, protocols, etc.

In other example embodiments, additional wireless transceivers may be employed, for example a first wireless transceiver for communicating with a cellular network, a second wireless transceiver for communicating with WiFi devices, and a third wireless transceiver for obtaining GPS data. In still yet another example embodiment, one wireless transceiver, e.g., wireless transceiver 502 performs a combination of functions such as cellular and GPS and/or WiFi and GPS.

Figure 6:
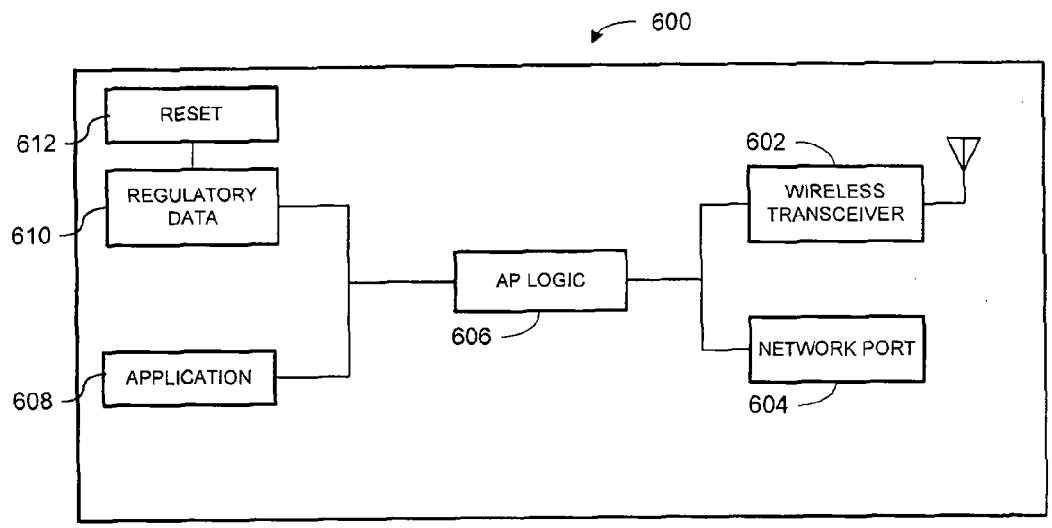
FIG. 6 is a block diagram illustrating an example of an access point upon which an example embodiment can be implemented.

FIG. 6 is a block diagram illustrating an example of an access point 600 upon which an example embodiment can be implemented. Access point 600 is suitable for implementing any of APs 104 (FIG. 1), AP 202 (FIG. 2), APs 302, 304, 306 (FIG. 3) and/or APs 402, 404, 406 (FIG. 4). Access point 600 comprises a wireless transceiver 602, network port (which may be wired or wireless) 604 and AP logic 606 for performing the functionality described herein.

In an example embodiment, AP logic 606 executes application 608 while AP 600 is not configured with regulatory domain data. In an example embodiment, a predefined signal such as a basic service set identifier (BSSID) may be broadcast via wireless transceiver 602 while AP 600 is not configured. In another example embodiment, wireless transceiver 602 may listen on a predefined channel (for example a global channel such as 2.4 GHz may be defined) for a predefined signal from a device capable of providing regulatory domain data.

In an example embodiment, once application 608 receives regulatory domain data 610, application 608 stops. In particular embodiments, application 608 will not execute as long as AP 600 is configured with regulatory domain data. An aspect of this example embodiment is that it can prevent rogue devices from re-programming AP 600. A reset function 612 may be provided to clear regulator domain data 610. In an example embodiment, reset function 612 may be embodied in a switch disposed within AP 600. In other example embodiments, reset function may be embodied in logic coupled to AP logic 606. For example reset function may be configured to reset upon receiving a special code via wireless transceiver 602 and/or network port 604. In particular embodiments, the special code is received from an authenticated source.

In an example embodiment, AP 600 receives the operating parameters for regulatory domain with regulatory domain data 610 received via wireless transceiver 602. In another example embodiment, upon receiving regulatory domain data via wireless transceiver 602, AP logic 606 obtains the operating parameters for the regulatory domain via network port 604. For example, AP logic 606 may be provisioned with an address for a server to obtain the operating parameters. In particular embodiments, the server is authenticated prior to obtaining the operating parameters. The data for authenticating the server may be provided via wireless transceiver 602 or may be installed in AP logic 606 at the factory. In an example embodiment, application 608 is configured with data for authenticating the provisioning server.

In an example embodiment, upon receiving the operating parameters, wireless transceiver 602 is configured to operate employing the operating parameters. In particular embodiments, if AP 600 belongs to a group of APs, AP 600 may employ wireless transceiver 602 or network port 604 to configure the remaining members of the group.

Figure 7:
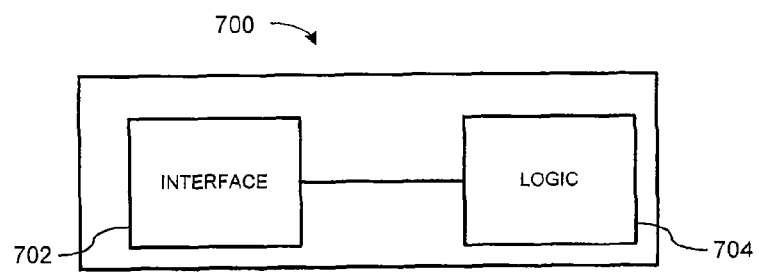
FIG. 7 is a block diagram illustrating an example of a server upon which an example embodiment can be implemented.

FIG. 7 is a block diagram illustrating an example of a server 700 upon which an example embodiment can be implemented Server 700 is suitable for implementing the functionality of server 206 (FIG. 2) and/or server 410 (FIG. 4). Server 700 suitably comprises an interface 702 for communicating with external devices and logic 704 for implementing the functionality described herein. Logic 704 is configured to receive regulatory domain data for a device via interface 702 and determine the operating parameters appropriate for the regulator domain. Logic 704 may be further configured to authenticate with the device before providing the operational parameters. For example, logic 704 may be configured with certificates, public/private keys, and/or shared secrets for authenticating devices requesting regulatory domain data.

FIG. 8 is a block diagram of a computer system 800 upon which an example embodiment can be implemented. For example, computer system 800 is suitable for implementing the functionality described herein for mobile wireless device 102 (FIGS. 1-4), AP 104 (FIG. 1), AP 202 (FIG. 2), server 206 (FIG. 2), APs 302, 304, and 306 (FIG. 3), APs 402, 404, 406 and server 410 (FIG. 4), MWD logic 504 (FIG. 5), GPS/location logic 506 (FIG. 5), AP logic 606 (FIG. 6), and/or logic 704 (FIG. 7).

Computer system 800 includes a bus 802 or other communication mechanism for communicating information and a processor 804 coupled with bus 802 for processing information. Computer system 800 also includes a main memory 806, such as random access memory (RAM) or other dynamic storage device coupled to bus 802 for storing information and instructions to be executed by processor 804. Main memory 806 also may be used for storing a temporary variable or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a user interface 812. User interface may suitably comprise a display such as a liquid crystal display (LCD), for displaying information to a computer user. User interface 812 may further comprise an input device, such as a keyboard including alphanumeric and other keys, a mouse or a touchscreen coupled to bus 802 for communicating information and command selections to processor 804.

An aspect of the example embodiment is related to the use of computer system 800 for initialization of regulatory configurations of unlicensed wireless devices. According to an example embodiment, initialization of regulatory configurations to unlicensed wireless devices is provided by computer system 800 in response to processor 804 executing one or more sequences of one or more instructions contained in main memory 806. Such instructions may be read into main memory 806 from another computer-readable medium, such as storage device 810. Execution of the sequence of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 804 for execution. Such a medium may take many forms, including but not limited to non-volatile media, and volatile media. Non-volatile media include for example optical or magnetic disks, such as storage device 810. Volatile media include dynamic memory such as main memory 806. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 804 for execution. For example, the instructions may initially be borne on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806 from which processor 804 retrieves and executes the instructions.

The instructions received by main memory 806 may optionally be stored on storage device 810 either before or after execution by processor 804.

Computer system 800 also includes a communication interface 814 coupled to bus 802. Communication interface 814 provides a two-way data communication coupling computer system 800 to external devices as illustrated by communications link 816. Communication interface 814 is suitably a wired or wireless interface appropriate for communication link 816. In an example embodiment, a plurality of communication interfaces may be employed for communicating over one or more links. For example, a plurality of communication interfaces 814 may be employed for wireless communications such as cellular, WiFi, and/or GPS and/or wired communications such as across a wireless local area network (LAN) or the Internet.

In view of the foregoing structural and functional features described above, methodologies in accordance with example embodiments will be better appreciated with reference to FIGS. 9-11. While, for purposes of simplicity of explanation, the methodologies of FIGS. 9-11 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement a methodology in accordance with an aspect of an example embodiment. The methodologies described herein are suitably adapted to be implemented in hardware, software, or a combination thereof.

FIG. 9 is a block diagram of an example methodology 900 for employing a wireless device to configure a second wireless device. Methodology 900 may be implemented by mobile wireless device 102 described in FIGS. 1-4, mobile wireless device 500 (FIG. 5), and/or computer system 800 (FIG. 8).

At 902, the location of a wireless device is determined. The location may be determined by any suitable means such as GPS, cellular network, or derived from signals received by the device from sources with known locations.

At 904, communications are established with a device to be configured. For example, the device may listen for beacons on a predefined channel. As another example, connecting to the device may include listening for beacons from a predefined BSSID. In particular embodiments, authentication may also be performed. The authentication may employ any suitable means such as public/private keys, shared secrets, certificates, etc. In an example embodiment, a first wireless transceiver may be employed to determine the current location (for example a GPS or cellular transceiver) while a second (wired or wireless) transceiver is employed to communicate with the device to be configured.

At 906, the device to be configured, is configured. The device to be configured is provisioned with data representative of a regulatory domain. In particular embodiments, the device to be configured is further provisioned with operating parameters such as channels, power levels, protocols, etc.

FIG. 10 is a block diagram of an example methodology 1000 for configuring a plurality of wireless devices. Methodology 1000 may be implemented by mobile wireless device 102 described in FIGS. 1-4, mobile wireless device 500 (FIG. 5), computer system 800 (FIG. 8), and in particular the embodiments described in FIG. 2 and/or FIG. 4. The wireless devices, APs in this example, can be grouped based on physical location, for example the devices are in wireless communications with each other, or by other means such as a range of IP address, and/or an IP subnet.

At 1002, the location of a wireless device is determined. The location may be determined by any suitable means such as GPS, cellular network, or derived from signals received by the device from sources with known locations.

At 1004, scanning for an AP is implemented. The scanning may suitably comprise listening on a predefined channel and/ or listening for a specific BSSID, and/or sending a predefined signal such as a predefined probe request and waiting for a response.

In an example embodiment, if an AP is found, a determination is made whether the AP is a "master AP" capable of configuring the remaining APs in the group. At 1006, if the AP is not a master AP (NO), scanning for APs resumes at 1004. If, the AP is a master AP (YES), then the AP is configured at 1008.

At 1008, the AP is configured. The AP is provisioned with data representative of a regulatory domain. In particular embodiments, the AP is further provisioned with operating parameters such as channels, power levels, protocols, etc. The configured AP then provisions the appropriate data to the remaining APs belonging to the group.

FIG. 11 is a block diagram of an example methodology 1100 for a wireless device to receive regulatory domain data. Methodology 1100 may be implemented by any of APs 104 (FIG. 1), AP 202 (FIG. 2), APs 302, 304, 306 (FIG. 3) and/or APs 402, 404, 406 (FIG. 4), AP 600 (FIG. 6), and/or computer system 800 (FIG. 8).

At 1102, a configuration mode is entered. In this mode the device, for example AP, can be configured. This mode may be set as a factory default until configured. In an example embodiment, this mode may be entered by activating a preset switch within a wireless device. In another example embodiment, a software command may be sent to the wireless device, and in particular embodiments the wireless device authenticates the source sending the command. The source sending the command may be authenticated by any suitable means such as certificates, shared (e.g., public/private) keys, and/or shared secret.

In an example embodiment, operation of the wireless device is restricted while in configuration mode. For example, the wireless device may be configured to send only predefined signals, such as beacons, on a predefined channel, and/or advertise a special, predefined BSSID on a predefined channel (for example 2.4 GHz). In an example embodiment, the wireless device may listen for a predefined signal.

At 1104, regulatory domain data is obtained. For example, the wireless device establishes communication with another wireless device and receives regulatory domain data from the other device. In particular embodiments, the wireless device authenticates with the wireless device sending the regulatory domain data. Authentication may be accomplished by any suitable means such as validating certificates, public/private key, shared secret, etc.

In an example embodiment, data representative of the regulatory domain may be received from a wireless device, and a second means may be employed to obtain the appropriate operating parameters corresponding to the regulatory domain. For example, a server on a network may be employed for provisioning operating data. The wireless device may be pre-configured with an address (such as an IP address) for the server and/or the address of the server may be received with the regulatory domain data. The server may be a public server or a private server wherein the wireless device authenticates with the server via any suitable means before obtaining the operating parameters. The operating parameters may include but are not limited to operating channels, power levels, data rates, protocols, etc.

At 1106, the wireless device is configured to operate in the regulatory domain obtained at 1104. In an example embodiment, the wireless device may also configure other wireless devices belonging to the same group. Groupings may be established by subnet domains, such as IP subnet domains, a range of IP address, wireless devices (such as APs) within wireless communication range, and/or wireless devices coupled to the same switch. The regulatory domain data may be sent to the other devices wirelessly, for example on a predefined channel such as 2.4 GHz or through a network which may be wired or wireless (e.g. Mesh).

At 1108, the wireless device enters the operational mode. In this mode, the wireless device operates using parameters appropriate for the regulatory domain. In an example embodiment, the wireless device is configured to remain in the operational mode and does not re-enter the configuration mode. In another example embodiment, the wireless device may be placed into configuration mode by activating a switch and/or sending a predefined command to the wireless device, and in particular embodiments the source of the command is authenticated.

Figure 12:
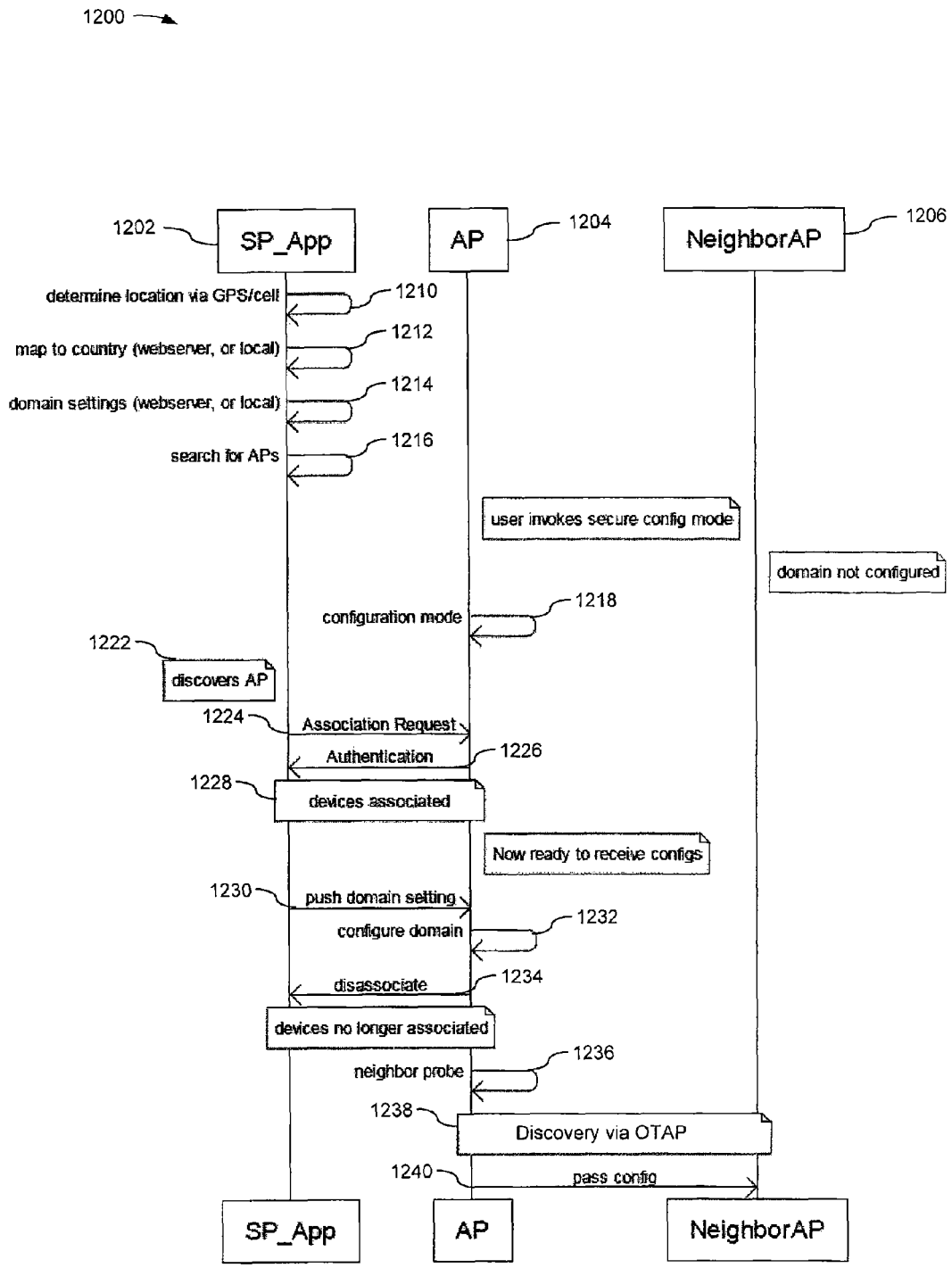
FIG. 12 is an example of a state diagram for an initial configuration of an access point.

FIG. 12 is an example of a state diagram 1200 for an initial configuration of an access point. Included in this example is a special application (SP_APP) 1202 on a mobile wireless device such as a smart phone that is employed for configuring access point (AP) 1204. In an example embodiment, the application is a controlled, secure application. In this example, AP 1204 is operable to provision at least one neighbor AP 1206 via Over the Air Provisioning (OTAP).

At state 1210, SP_APP 1202 determines a location for a device associated with SP_APP 1202. At state 1212, SP_APP maps its coordinates. The mapping may be performed on a map provided by a web server or a map local to SP_APP 1202. At state 1214, SP_APP determines the regulatory domain settings. The regulatory domain settings may be obtained via a webserver or obtained locally. SP_APP 1202 is not ready to configure an AP, and as illustrated 1216, SP_APP searches for APs. AP 1204 is in a configuration mode as illustrated by state 1218. In the illustrated example AP 1204 enters the configuration mode (state 1218) after state 1216, however, those skilled in the art should readily appreciate that AP 1204 may enter configuration mode any time before, during, or after any of states 1210, 1212, 1214, and 1216.

At 1222, SP_APP 1202 discovers AP 1204. At state 1224 an association request is sent from the device associated with SP_APP 1202. At state 1226 AP 1204 authenticates with the device associated with SP_APP 1202. Upon successfully authenticating, as illustrated by 1228 the device associated with SP_APP 1202 and AP 1204 are associated. AP 1204 is ready to receive configuration data.

At state 1230, SP_APP 1202 pushes a regulatory domain setting to AP 1204. At state 1232, AP 1204 configures itself for the regulatory domain. At state 1234, AP 1204 disassociates with SP_APP 1202 (or the device associated with SP_APP 1202).

At state 1236, AP 1204 sends a neighbor probe. In the example illustrated in FIG. 12, the domain neighbor AP 1206 has not yet been configured. At state 1238, AP 1204 discovers neighboring AP 1206 employing Over The Air Provisioning (OTAP). The discovery at state 1238 may include an exchange of several messages such as a probe response, authentication messages, etc. At state 1240, AP 1204 passes regulatory domain configuration data to neighbor AP 1206.

Figure 13:
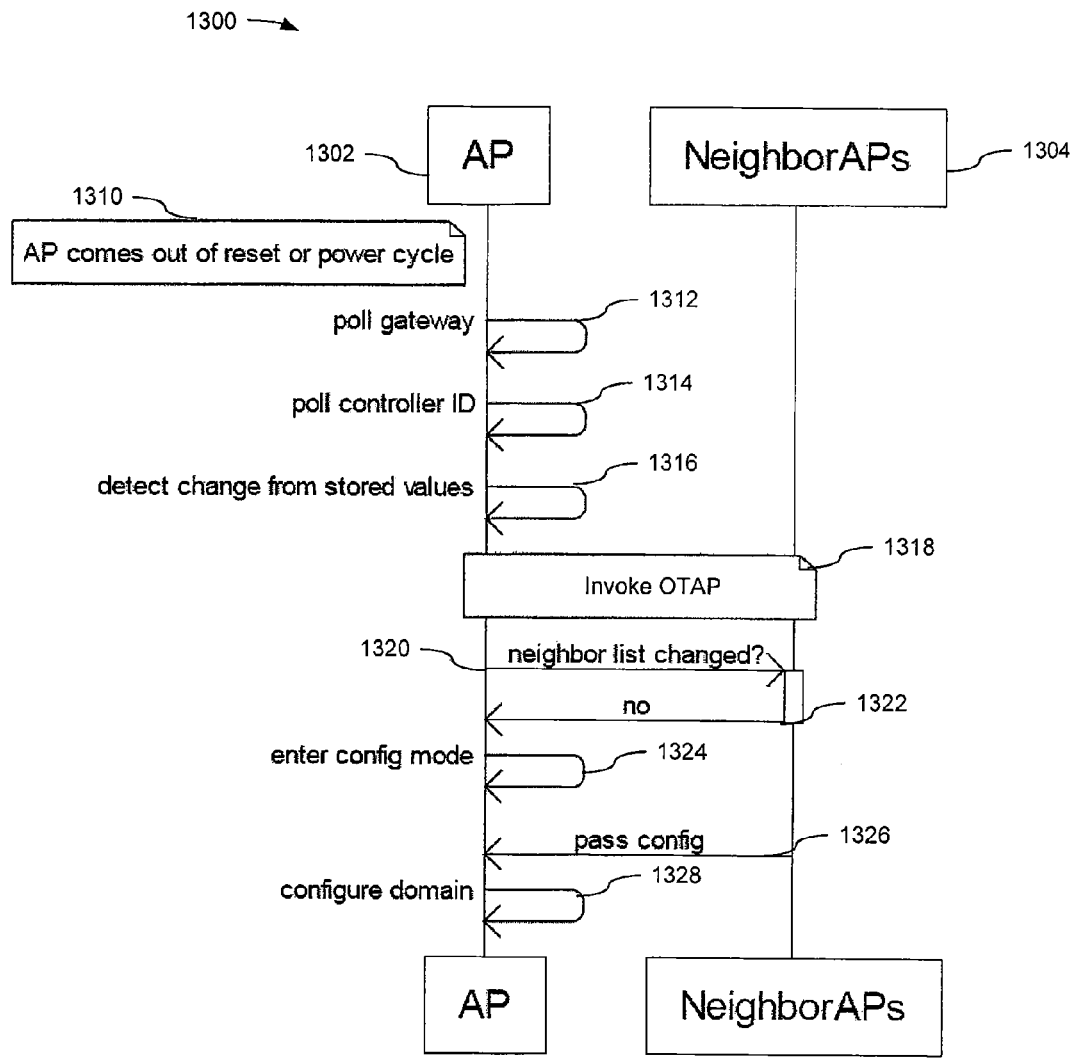
FIG. 13 is an example of a state diagram for a situation where an access point wakes up and determines that the controller and gateway have changed but the neighboring access points are the same.

FIG. 13 is an example of a state diagram 1300 for a situation where an access point (AP 1302 in this example) wakes up and determines that the controller and gateway have changed but the neighboring access points are the same. In this example AP 1302 comes out of a reset or power cycle as illustrated by 1310. At state 1312, AP 1302 polls the gateway coupled with AP 1302. At state 1314, AP 1302 polls the controller coupled with AP 1302. At state 1316, AP 1302 compares the values obtained for the gateway and controller in states 1312 and 1314 respectively with previously stored values. In this example, as illustrated by state 1316 AP 1302 detects a change in the controller and/or gateway based on previously stored values.

At state 1318, AP 1302 invokes OTAP to detect neighbor APs 1304. At state 1320, AP 1302 determines whether neighbor APs 1304 have changed, which at state 1322 (NO) is determined that neighbor APs 1304 have not changed.

At state 1324, AP 1302 enters configuration mode. At state 1326, one of neighbor APs 1304 passes the configuration for the regulatory domain to AP 1302. At state 1328, AP 1302 configures itself for the regulatory domain.

Figure 14:
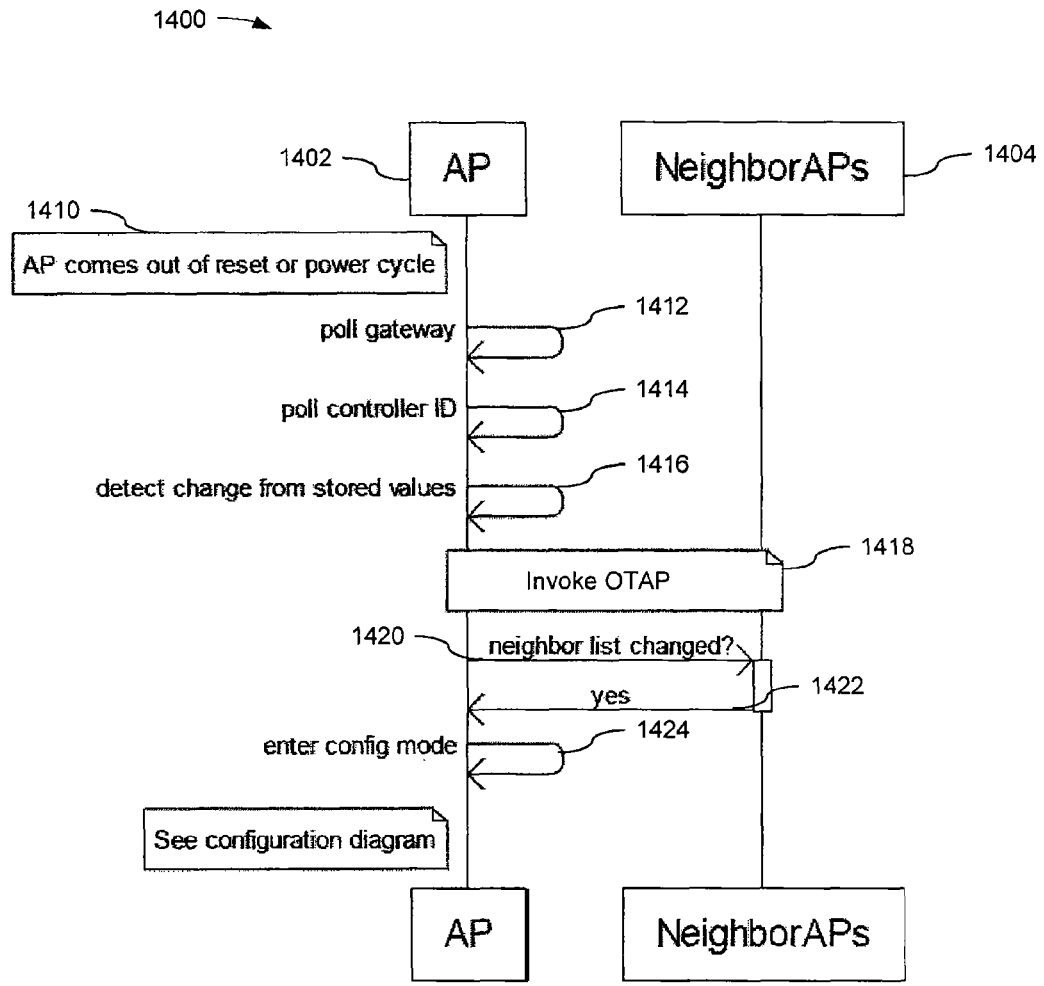
FIG. 14 is an example of a state diagram for a situation where an access point wakes up and determines a new configuration is required.

FIG. 14 is an example of a state diagram 1400 for a situation where an access point (AP 1402 in this example) wakes up and determines a new configuration is required. As illustrated at 1410, AP 1402 comes out of a reset or power cycle. At state 1412, AP 1402 polls the gateway coupled with AP 1402. At state 1414, AP 1402 polls (e.g., obtains the controller ID) the controller associated with AP 1402. AP 1402 then compares the gateway and controller identifiers obtained in states 1412 and 1414 respectively with previously stored values and in this example, as illustrated by state 1416, AP 1402 detects a change in the controller and/or gateway based on previously stored values.

Since the controller and/or gateway changed, at state 1418 AP 1402 invokes OTAP to communicate with neighbor APs 1404. At state 1420, AP 1402 determines whether the neighbor list for neighboring APs 1404 has also changed, which in this example the neighboring list has changed as illustrated at state 1422. Because the gateway, controller and neighbor APs have changed, at state 1424 AP 1402 enters configuration mode. In configuration mode, AP 1402 may enter states 1224, 1226, 1230, and 1234 as described in FIG. 12 supra, and in particular embodiments may also enter states 1236, 1238, and 1240 described in FIG. 12 supra.

Figure 15:
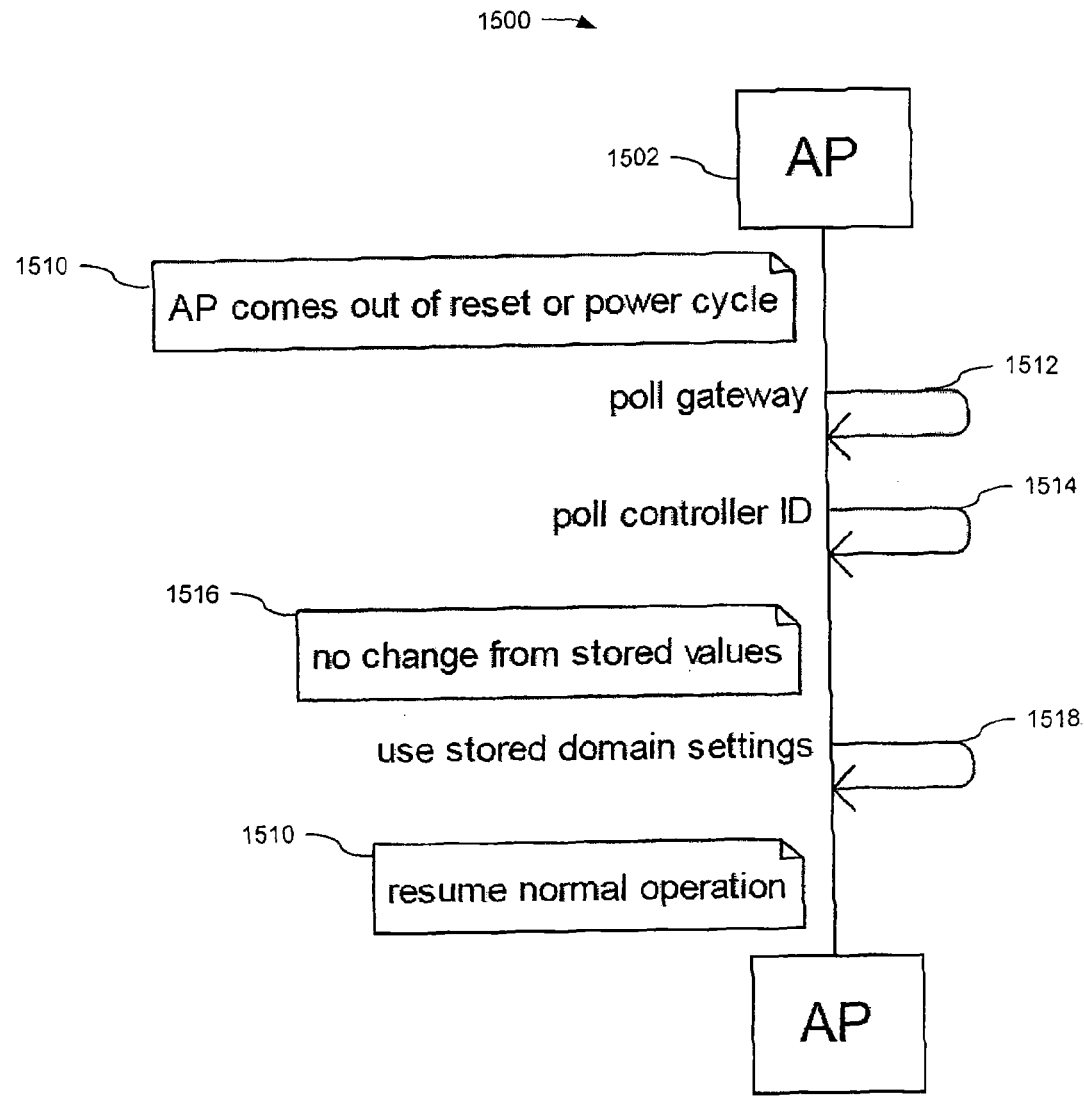
FIG. 15 is an example of a state diagram for a situation where an access point wakes up and determines that the operating environment has not changed.

FIG. 15 is an example of a state diagram 1500 for a situation where an access point (AP 1502 in this example) wakes up and determines that the operating environment has not changed. As illustrated by 1510, AP 1502 comes out of a reset or power cycle. At state 1512, AP 1502 polls the gateway coupled with AP 1502. At state 1514, AP 1502 polls the controller (e.g. obtains the controller ID) of the controller coupled with AP 1502. AP 1502 compares the values obtained from the gateway and controller in states 1512 and 1514 respectively with stored values and determines that there was no change from the stored values as illustrated at 1516. AP state 1518, AP 1502 configures itself using stored regulatory domain settings, and resumes normal operations as illustrated at 1510.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. An apparatus, comprising:
a wireless interface;
a controller coupled with the wireless interface;
wherein the controller determines from data received via the wireless interface a current location of the apparatus;
wherein the controller determines a regulatory domain associated with the current location of the apparatus;
wherein the controller stores regulatory domain data representative of the regulatory domain associated with the current location;
wherein the controller searches for a wireless device to be configured;
wherein the controller selectively provisions the wireless device to be configured with the stored regulatory domain data representative of configuration data for operating in the regulatory domain associated with the current location of the apparatus responsive to being unable to determine a current location via the wireless interface while communicating with the wireless device to be configured;
wherein the controller obtains data representative of a plurality of wireless devices to be configured that belong to a group;
wherein the controller scans the plurality of wireless devices to be configured that belong to the group to determine whether any of the plurality of wireless devices to be configured that belong to the group is capable of configuring the remaining wireless devices to be configured that belong to the group;
wherein the controller selects a first wireless device of the plurality of wireless devices to be configured that belong to the group capable of configuring the remaining wireless devices to be configured that belong to the group as a master wireless device;
wherein the controller selectively provisions the master wireless device with the regulatory domain data representative of the regulatory domain associated with the current location.

2. The apparatus set forth in claim 1, wherein the regulatory domain data representative of configuration data for operating in the regulatory domain associated with the current location comprises data representative of available channels and maximum transmit power.

3. The apparatus set forth in claim 1, further comprising a second wireless interface;
wherein the controller employs the second wireless interface to search for the wireless device to be configured;
wherein the controller employs the first wireless interface to obtain the regulatory domain data representative of configuration data for operating in the regulatory domain associated with the current location; and
wherein the controller employs the second wireless interface for provisioning the wireless device with the regulatory domain data representative of configuration data for operating in the regulatory domain associated with the current location.

4. The apparatus set forth in claim 3, wherein the first wireless interface employs a cellular networking protocol to determine the regulatory domain data representative of configuration data for operating in the regulatory domain associated with the current location.

5. The apparatus set forth in claim 1, wherein the controller further provisions the wireless device with an Internet Protocol ("IP") address of a server for the wireless device to obtain operating parameters associated with the regulatory domain.

6. The apparatus set forth in claim 1, wherein the controller searches for a predefined basic service set ("BSS") to search for the wireless device to be configured.

7. The apparatus set forth in claim 1, wherein the controller searches a predefined channel to search for the wireless device to be configured.

8. The apparatus set forth in claim 1, wherein the controller stores the regulatory domain data representative of configuration data for operating in the regulatory domain associated with the current location for a predefined time period.

9. The apparatus set forth in claim 1, further comprising a wired interface for coupling with the wireless device to be configured; and
    wherein the controller employs the wired interface provisioning the wireless device with the regulatory domain data representative of configuration data for operating in the regulatory domain associated with the current location.

10. A method, comprising:
    determining a current geo-location by a first wireless device;
    mapping the current geo-location to a regulatory domain;
    obtaining operating parameters for the regulatory domain;
    storing the operating parameters for a predetermined time period, wherein the operating parameters comprise data representative of available channels and maximum transmit power;
    searching for a second wireless device to configure;
    selectively provisioning, by the first wireless device, the second wireless device with the stored operating parameters for the regulatory domain responsive to the first wireless device being unable to determine its current location and the predetermined time period has not expired;
    obtaining data representative of a plurality of wireless devices to be configured that belong to a group;
    scanning the plurality of wireless devices to be configured that belong to the group to determine whether any of the plurality of wireless devices to be configured that belong to the group is capable of configuring the remaining wireless devices to be configured that belong to the group;
    selecting a first wireless device capable of configuring the remaining wireless devices to be configured that belong to the group as a master wireless device; and
    selectively provisioning the master wireless device with the regulatory domain data representative of the regulatory domain associated with the current location.

11. Logic encoded in a non-transitory computer readable medium for execution by a processor and when executed operable to:
    determine a current geo-location of a first wireless device;
    map the current geo-location of the first wireless device to a regulatory domain;
    obtain operating parameters for the regulatory domain;
    storing the operating parameters for a predetermined time period, wherein the operating parameters comprise data representative of available channels and maximum transmit power;
    searching for a second wireless device to configure;
    selectively provisioning, by the first wireless device, the second wireless device with the stored operating parameters for the regulatory domain responsive to the first wireless device being unable to determine its current location and the predetermined time period has not expired;
    obtain data representative of a plurality of wireless devices to be configured that belong to a group;
    scan the plurality of wireless devices to be configured that belong to the group to determine whether any of the plurality of wireless devices to be configured that belong to the group is a wireless device capable of configuring the remaining wireless devices to be configured that belong to the group;
    select a first wireless device of the plurality of wireless devices to be configured that belong to the group capable of configuring the remaining wireless devices to be configured that belong to the group as a master wireless device;
    selectively provision the selected master wireless device with the operating parameters for the regulatory domain based on the location of the first wireless device.

* * * * *